US011328373B2

(12) United States Patent
Hewitt et al.

(10) Patent No.: US 11,328,373 B2
(45) Date of Patent: May 10, 2022

(54) GENERATING CONSOLIDATED TRAVEL RECORDS FROM DISTINCT FORMATS

(71) Applicant: GBT TRAVEL SERVICES UK LIMITED, London (GB)

(72) Inventors: Trent Hewitt, Melbourne (AU); Andrew Wardle, Melbourne (AU); David Naftzger, Melbourne (AU); Julian Oxborough, Melbourne (AU); Greg Baran, Melbourne (AU)

(73) Assignee: GBT TRAVEL SERVICES UK LIMITED, London (GB)

( * ) Notice: Subject to any disclaimer, the term of this patent is extended or adjusted under 35 U.S.C. 154(b) by 414 days.

(21) Appl. No.: 16/063,063

(22) PCT Filed: Dec. 16, 2016

(86) PCT No.: PCT/IB2016/057695
§ 371 (c)(1),
(2) Date: Jun. 15, 2018

(87) PCT Pub. No.: WO2017/103864
PCT Pub. Date: Jun. 22, 2017

(65) Prior Publication Data
US 2020/0143495 A1    May 7, 2020

Related U.S. Application Data

(60) Provisional application No. 62/269,659, filed on Dec. 18, 2015.

(51) Int. Cl.
*G06Q 50/14*    (2012.01)
*G06Q 10/02*    (2012.01)

(52) U.S. Cl.
CPC .............. *G06Q 50/14* (2013.01); *G06Q 10/02* (2013.01)

(58) Field of Classification Search
CPC . G06F 7/14; G06F 7/32; G06F 16/215; G06F 16/2365; G06Q 10/08; G08G 1/20; G08G 1/202; G08G 1/205; G08G 1/207; G05Q 50/30
USPC .......................................................... 705/5
See application file for complete search history.

(56) References Cited

U.S. PATENT DOCUMENTS

| | | | |
|---|---|---|---|
| 7,539,847 B2 | 10/2009 | Block et al. | |
| 2002/0152100 A1* | 10/2002 | Chen ...................... | G06Q 10/02 705/5 |

(Continued)

OTHER PUBLICATIONS

T. Aihkisalo and T. Paaso, "A Performance Comparison of Web Service Object Marshalling and Unmarshalling Solutions," 2011 IEEE World Congress on Services, 2011, pp. 122-129, doi: 10.1109/SERVICES.2011.61. (Year: 2011).*

(Continued)

*Primary Examiner* — Rupangini Singh
*Assistant Examiner* — Jessie James Shafer
(74) *Attorney, Agent, or Firm* — K&L Gates LLP

(57) ABSTRACT

A method and system for consolidating travel records from on the one hand a source derived from a Global Distribution System or more generally a first travel database, and on the other hand a source derived from non-Global Distribution System information or more generally a second travel database. It is determined whether unique identifiers associated with the two sources match, indicating that information from the source travel records can be consolidated without compromising data integrity.

2 Claims, 10 Drawing Sheets

(56) References Cited

U.S. PATENT DOCUMENTS

| | | | |
|---|---|---|---|
| 2003/0109266 A1 | 6/2003 | Rafiah et al. | |
| 2003/0126156 A1* | 7/2003 | Stoltenberg | G06F 16/215 |
| 2006/0184584 A1* | 8/2006 | Dunn | G06F 16/24556 |
| 2006/0287880 A1 | 12/2006 | Fitzgerald et al. | |
| 2006/0294151 A1* | 12/2006 | Wong | G06F 16/25 |
| 2007/0168238 A1* | 7/2007 | Marcken | G06Q 10/025 |
| | | | 705/6 |
| 2009/0012824 A1* | 1/2009 | Brockway | G06Q 10/025 |
| | | | 705/6 |
| 2011/0137666 A1* | 6/2011 | Zuida | G06Q 30/02 |
| | | | 705/1.1 |
| 2012/0330906 A1* | 12/2012 | Fredericks | G06F 16/29 |
| | | | 707/692 |
| 2013/0151291 A1 | 6/2013 | Salway | |
| 2015/0269193 A1* | 9/2015 | King | G06F 40/221 |
| | | | 707/694 |
| 2015/0294234 A1* | 10/2015 | Alberola | G06Q 10/02 |
| | | | 705/5 |
| 2015/0347408 A1* | 12/2015 | Fontebride | G06F 16/24573 |
| | | | 707/638 |

OTHER PUBLICATIONS

International Search Report and Written Opinion for International Application No. PCT/IB2016/057695 dated Feb. 28, 2017.

* cited by examiner

FIG. 7A
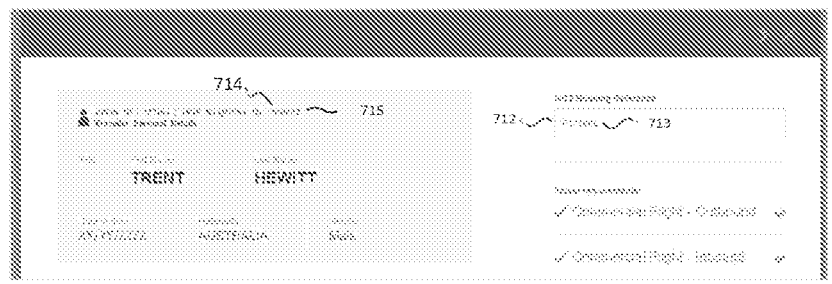
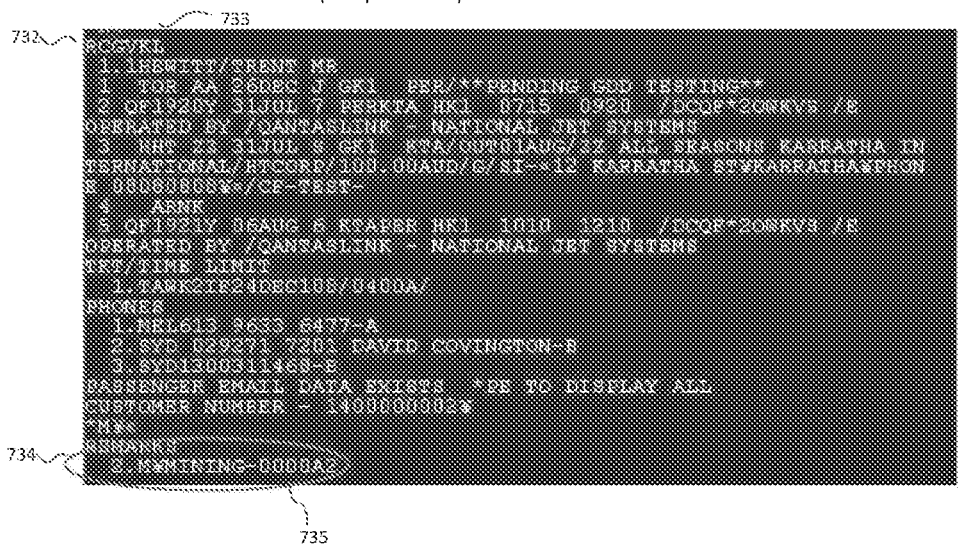
FIG. 7B

Page 1 of 3

Travel Arrangements for: HEWITT/TRENT MR

Booking Reference RCGVKL — 810

Customer Address                                    Agent KIRA MCLENNAN

263 COLLINS STREET
MELBOURNE VIC 300

TOUR
Sunday 31 July 2016

✈ 07:15 | Perth (PER) to Karratha (KTA)
811 | Airline Booking Ref: 2OWKVS
| Carrier: Qantas Airways    Flight: QF 1920   Status: Confirmed
| Operated By: qantaslink - National Jet Systems
| Origin: Perth, WA, Perth Arpt (PER)
| Departing: Sunday 31 July 2016 at 07:15    Departure Terminal: TERMINAL 4 - QANTAS
| Destination: Karratha, WA, Karratha Airport (KTA)
| Arriving: Sunday 31 July 2016 at 09:30    Arrival Terminal: Not Applicable
| Additional Information
| Class: Economy    Distance: 777 Miles    Estimated Time: 0 hours 00 minutes
| Aircraft Type: Boeing 717    Seat: Not Assigned
| Meal Service: Breakfast
| Frequent Flyer Number: Not Applicable
| Meal Request: Not Assigned
| Number of Stops: 0

🏨 | ALL SEASONS KARRATHA INTERNATIONAL
812 | Address: 12 KARRATHA ST, KARRATHA
| Phone: 08560606    Fax: Not Applicable
| Check In Date: Sunday 31 July 2016
| Check Out Date: Monday 01 August 2016
| Number Of Nights: 1
|   Rate: AUD 100.00 per night may be subject to local taxes and service charges
|   Guaranteed to: Not Applicable
|   Reference Number: TEST    Status: Confirmed    Number Of Rooms: 1
| Additional Information
|   Membership ID: Not Applicable    Corporate ID: Not Applicable

FIG. 8A

Page 2 of 3

Monday 01 August 2016

05:00 | Karratha (KTA) to Onslow (ONS_001)
Airline Booking Ref: 343175
Carrier: Cobham          Flight: KO201    Status: Confirmed
Origin: Karratha, WA, Karratha (KTA)
Departing Monday 01 August 2016 at 05:00
Destination: Onslow, WA, Onslow (ONS_001)
Arriving Monday 01 August 2016 at 07:00
Additional Information
Estimated Time: 2 hours 00 minutes 08:00 | Onslow (ONS_001) to Pioneer Camp (PCA_001)
Booking Ref: 343176
Carrier: Bristows                         Status: Confirmed
Origin: Onslow, WA, Onslow (ONS_001)
Departing Monday 01 August 2016 at 08:00
Destination: Pioneer Camp, WA, Pioneer Camp (PCA_001)
Arriving Monday 01 August 2016 at 08:30
Additional Information
Estimated Time: 0 hour 30 minutes

Pioneer Camp
Address: Pioneer Camp, WA, Australia
Phone: 00001020666        Fax: Not Applicable
Check In Date: Monday 01 August 2016
Check Out Date: Friday 05 August 2016
Number Of Nights: 4
Reference Number: 343177        Status: Confirmed
Additional Information
Muster Point: XXX
Life Boat: XXX

Friday 05 August 2016

14:00 | Pioneer Camp (PCA_001) to Onslow (ONS_001)
Booking Ref: 343178
Carrier: Bristows                         Status: Confirmed
Origin: Pioneer Camp, WA, Pioneer Camp (PCA_001)
Departing Friday 05 August 2016 at 14:00
Destination: Onslow, WA, Onslow (ONS_001)
Arriving Friday 05 August 2016 at 14:30
Additional Information
Estimated Time: 0 hour 30 minutes

GENERATING CONSOLIDATED TRAVEL RECORDS FROM DISTINCT FORMATS

PRIORITY CLAIM AND CROSS-REFERENCE TO RELATED APPLICATIONS

This application claims the benefit under 35 U.S.C. § 371 to International Application No. PCT/IB2016/057695 filed on Dec. 16, 2016, which claims benefit to U.S. Provisional Application No. 62/269,659 filed Dec. 18, 2015. The entire disclosures of said applications are incorporated by reference herein for all purposes.

BACKGROUND

The journey of an individual traveler from an origin to a destination and back can involve coordination and integration of multiple modes of transportation, multiple accommodations, and multiple segments representing travel from one place to another. For example, a traveler may need to travel from a home city to a rural destination for a stay of several weeks, then return home in roughly the opposite manner. Thus, the traveler may begin with a commercial flight from the home city to a smaller city, and stay the night there in hotel accommodations. Then, the traveler can be booked on a second flight—e.g., a charter flight—to a third town, then go that day by charter bus to the rural site for several weeks' work. Local accommodations at the site (e.g., a mining site) will be needed. Two weeks later, the traveler will be in need of returning home. Again, bus, hotel, and air (charter and commercial) reservations may be in order. Of course, different and varied circumstances may apply. For example, the traveler could be traveling for pleasure or work from one major city to a second one, need a rental car, and have added travel reservations needs such as travel by helicopter, by water, and so on. In short, there can be multiple modes of transportation, accommodations, and segments, with resulting intricate challenges to coordinate and integrate such into one journey.

Although a single journey by an individual traveler may be involved, there may be multiple entities involved in arranging, reserving, and reporting the activities described. In other words, there may be as many entities as there are parties who must set up a commercial flight(s), charter flight(s), hotel accommodations, campsite (remote) accommodations, and bus leg(s), etc. Each of these entities may have different types or formats of electronic travel records created thereby. It will be appreciated that travel records stored in electronic form comprise data relating to the journey of a traveler or travellers. The electronic travel records may not be able to intercommunicate or otherwise interact with each other, impairing efficiency in coordinating and arranging the journey in the first place by the travel entities themselves, leaving empty seats on various modes of transportation, generating many travel documents, driving up overall cost, and/or leading to failure of successfully planning a comprehensive journey. In other words, impediments to intercommunication of and among electronic travel records of distinct formats can significantly and negatively impact travel planning in numerous ways. In addition, consolidating information from multiple records, if not properly executed, can weaken or destroy data integrity of any records downstream.

DRAWINGS

FIG. 7A illustrates one embodiment of a travel record that can be derived from nonGDS source information.

FIG. 7B illustrates one embodiment of a travel record that can be derived from GDS source information.

FIGS. 8A-8C illustrates one embodiment of a travel record that is consolidated from distinct formats.

SUMMARY OF THE INVENTION

Figure 1:
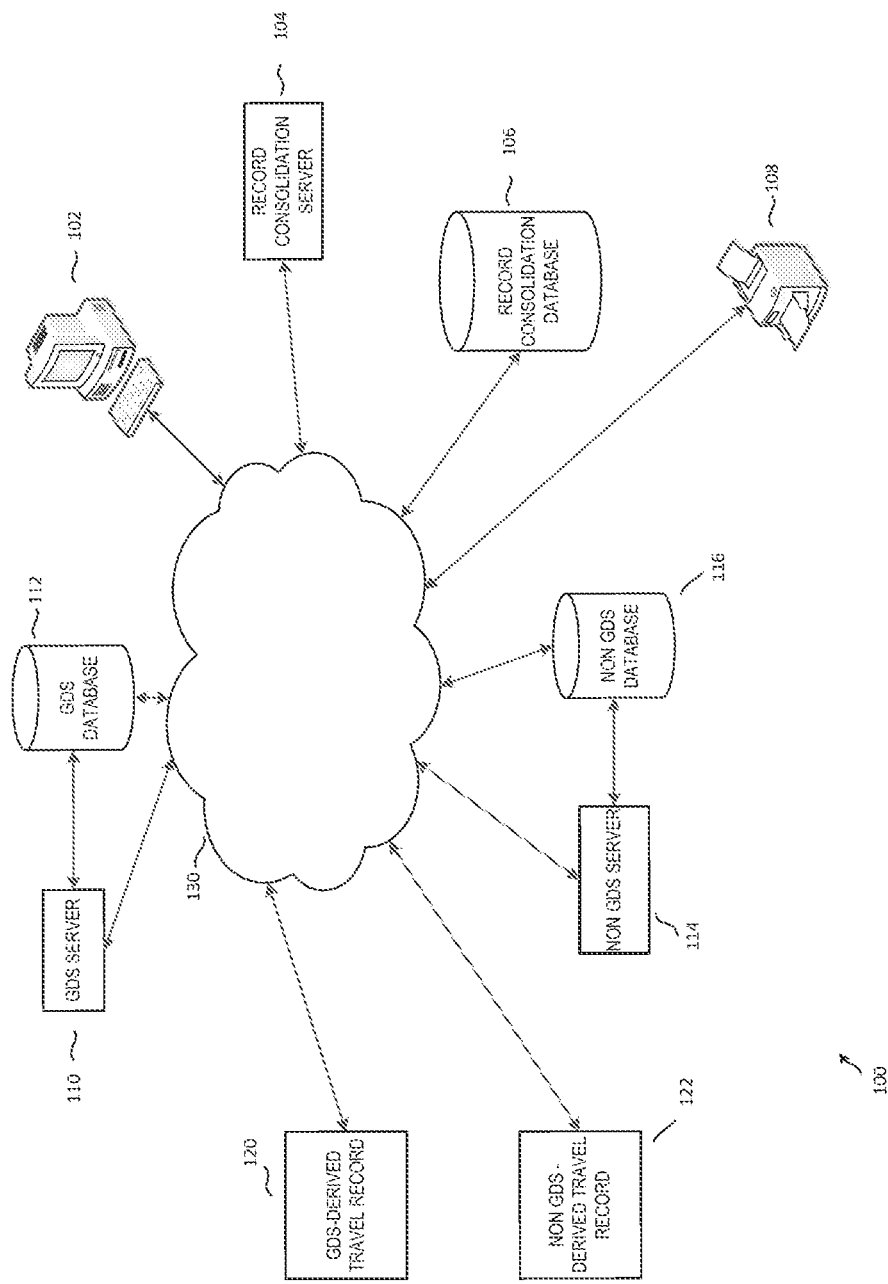
FIG. 1 illustrates one embodiment of an architecture and computing environment for consolidating records from distinct formats.

In embodiments are presented a computer-implemented method of consolidating electronic travel records where there are stored a plurality of electronic records, the records being of potentially different formats. For example, one travel record could be derived from information primarily associated with generally publicly available travel information, such as information available to subscribers to a Global Distribution System (GDS). A second travel record could be derived from information primarily associated with privately arranged travel options.

Thus, in embodiments there can be a first electronic travel record having information derived from a first travel database, the first electronic travel record having a first field associated with a first value, and a second field associated with a second value. Further, there can be stored a second electronic travel record having information derived from a second travel database, the second electronic travel record further having a third field associated with a third value, and a fourth field associated with a fourth value. It can be evaluated whether the first value matches the third value, and whether the second value matches the fourth value (or the first value matches the fourth, and the second matches the third). Based on the evaluations, it can be determined whether information from the first electronic travel record and information from the second electronic travel record can be consolidated into a consolidated electronic record, maintaining data integrity.

Additionally, it can be determined, in response to determining that both the first value matches the third value, and the second value matches the fourth value (or second and third, as well as first and fourth), that information derived from the first and second electronic travel records is eligible for consolidation into a consolidated electronic travel record. Such can be done by mechanism of processing with respect to a non-transitory computer-readable medium, with information structured for transmission over a computer network. The consolidated electronic record can comprise an itinerary for a traveller. In embodiments, the first record can comprise information derived from commercial transportation information, which can also be known as generally publicly available travel information, such as from a GDS. And, the second record can comprise information primarily from privately arranged travel options, such as charter reservations for an aircraft, for helicopters, for buses, and for campsite accommodation. Accordingly, in embodiments there are predetermined fields that can contain values, where the value can be a unique identifier associated with a trip such as on the one hand from a GDS and on the other from privately arranged options.

In addition, in embodiments is presented a system for consolidating electronic travel records. A first travel record can be derived from travel information based on primarily generally publicly available travel options, and contains a first itinerary identifier that uniquely identifies a set of travel information for a trip derived primarily from generally publicly available travel options, and a second itinerary identifier that uniquely identifies a set of travel information for a trip derived primarily from privately arranged travel options. Also, a second travel record can be stored that derives from travel information based on primarily privately arranged travel options and contains a third itinerary identifier that uniquely identifies a set of travel information for a trip derived primarily from generally publicly available travel options, and a fourth itinerary identifier that uniquely identifies a set of travel information for a trip derived primarily from privately arranged travel options. It can be determined whether the first itinerary identifier matches the third itinerary identifier or fourth itinerary identifier; it can also be determined whether the second itinerary identifier matches the third or fourth itinerary identifier. It can further be determined that, if one of the two itinerary identifiers on the first travel record matches one of the two itinerary identifiers on the second travel record, and the remaining itinerary identifiers on the first and second travel records also match, then the system can store an indication that information from the first travel record and the second travel record can be consolidated. This can further be carried out wherein the travel information from one of the records is based on primarily generally publicly available travel options is associated with a Global Distribution System, and the other of the records is based primarily on privately arranged travel options such as associated with a charter flight, a bus, a helicopter, or campsite accommodations.

In a general aspect, by systems and methods herein it can be determined that data integrity can be maintained if some set of information from the GDS record and nonGDS record can be merged or consolidated, thus providing many advantages.

DETAILED DESCRIPTION

Reference will now be made in detail to several non-limiting embodiments, including embodiments showing example implementations. The figures depict example embodiments of the disclosed systems, platforms and/or methods of use for purposes of illustration only. One skilled in the art will readily recognize from the following description that alternative example embodiments of the systems and methods illustrated herein may be employed without departing from the principles described herein.

Under certain circumstances, travel reservations can be viewed as falling under at least two classifications. The first is commercial travel, offerings for which can be based on a more or less regular schedule and can be directed to the public at large. The second can be charter travel, which can be based on needs of a specific individual or individuals and where transportation offerings can be based on a more or less custom schedule.

Systems have been developed for obtaining commercial transportation reservations, and charter transportation reservations. For commercial transportation reservations, a GDS (Global Distribution System) can be used, or another system where an individual or entity can access a database of travel and transportation offerings, including direct information from a source such as an airline, ground travel provider, rental car provider, rail, water, and many more. Thus in various embodiments different travel databases can be used.

For individualized transportation reservations, such as charter reservations, specialized applications can be used. For instance, a charter transportation application can comprise a nonGDS module. Such module—e.g., application, functionality, and/or processing mechanisms—can facilitate travel reservations derived from information primarily associated with a nonGDS source. Where a GDS or nonGDS module is used, there can be special front-end and back-end functionality operable with such GDS or nonGDS modules respectively such as functionality used by a travel management company (TMC).

FIG. 1 can illustrate a computing environment 100 for assisting with generating consolidated records from distinct formats. Record consolidation server 104 can be operatively associated with record consolidation database 106, as by a network 130. Network 130 can represent a network of any logical or physical size such as a broad network such as the Internet, and can represent a small one such as a LAN or hyperlocal network, it being understood that a network enables communication of data from one computing device to another. Record consolidation server 104 can be operatively associated with a computer(s), input device(s) and display(s) 102. Computer, input device and display 102 (wherein the foregoing can be singular or plural) can contain or be operatively associated with a processor(s), and with memory(ies) which may include software applications. Computer, input device and display 102 can comprise a personal computer, a laptop, a tablet, a mobile device such as a smart phone, smart glasses, or a smart watch; it will be appreciated that any device containing or in operative association with a processor(s) and a memory(ies) can serve the purpose of computer and input device 102. A printing functionality 108 can be employed; this can be a printer(s) and/or functionality to generate and deliver electronic travel records. As noted, record consolidation server 104 can be in operative communication with a network 130. Network 130 can permit operative communication of the foregoing functionalities with added devices, functionalities and modules. These can include a GDS server 110 and an associated GDS database 112 containing travel information such as commercial flights, hotels, and many more types of travel options and information. These can also include a nonGDS server 114 and an associated nonGDS database 116 containing travel information such as non-commercial flights, accommodations and other non-commercial (or individually developed and/or bespoke) travel options and information. The foregoing GDS and nonGDS travel options and information can be associated with servers 120, 122 and/or databases for GDS-derived travel records and nonGDS-derived travel records respectively.

It is understood that some or all of the foregoing functionalities can be in operative communication via one or more networks, wired or wireless. Each of the foregoing functionalities can be controlled by mechanism of software instructions embodied in a non-transitory computer medium.

Figure 2:
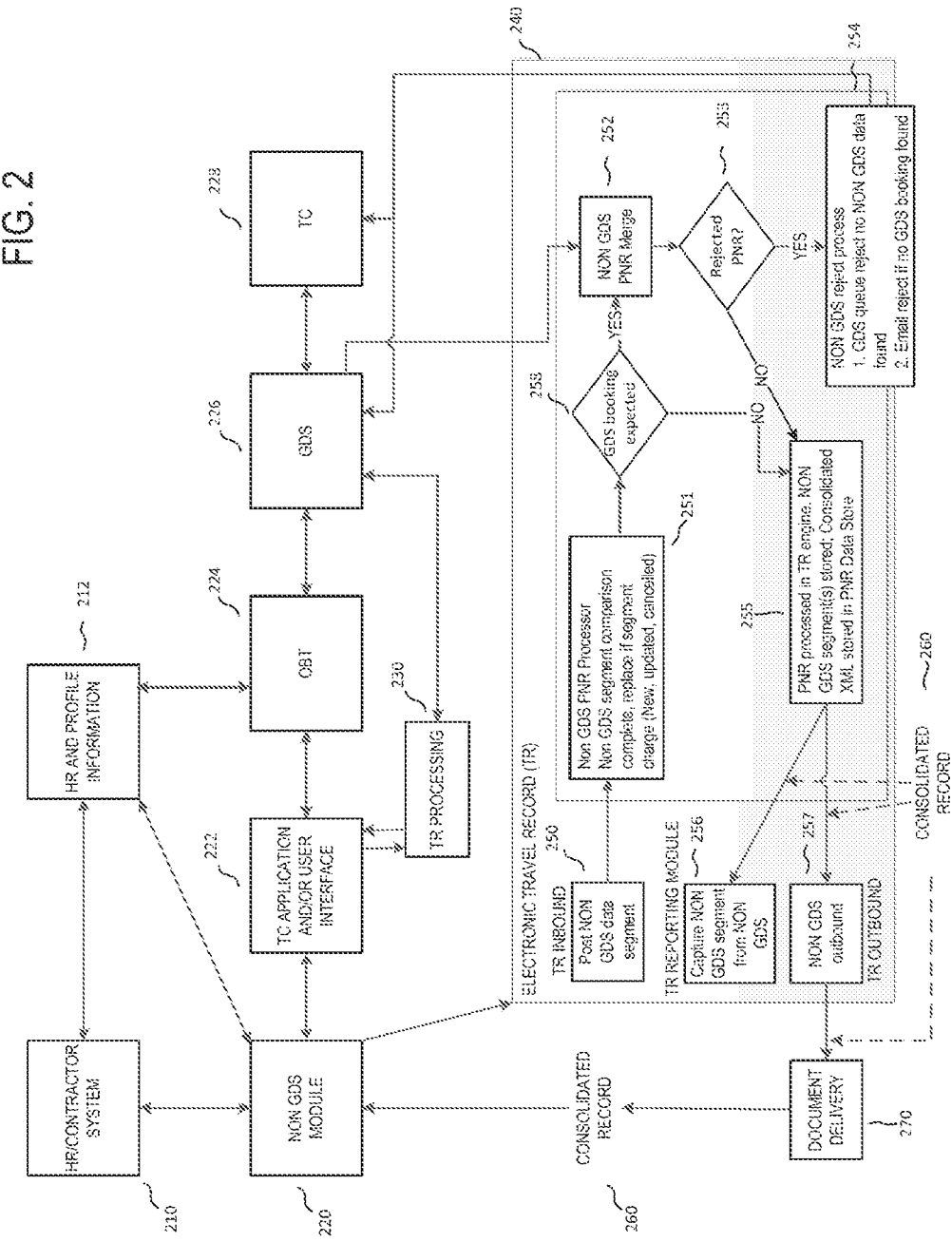
FIG. 2 illustrates one embodiment of interrelationships among modules and functionalities for consolidating records from distinct formats.

FIG. 2 illustrates one embodiment of interrelationships among modules and functionalities for consolidating records from distinct formats. An HR/Contractor system module 210 can be in operative communication with a HR and profile information module 212. A nonGDS module 220 and/or application, which can be used to process nonGDS travel options and information, can pass profile information. Non- GDS module 220 can also contain a rules engine. NonGDS module 220 can be in operative communication, as by web services, with a TC (Travel Consultant) application and/or user interface 222, whereby a TC can interact with added modules and functionalities of the system. TC application and/or user interface 222 can be in operative communication with a module and/or application that carries out travel record processing 230 including multiple travel records during a selected period. The TC application and/or user interface 222 can be in operative communication with an OBT 224 (online booking tool) to identify and create travel reservations. Such OBT 224 can be in operative communication with a GDS 226, itself in operative communication with a TC 228.

NonGDS module 220 can transmit a communication to an electronic travel record (TR) module and/or application 240. TR module and/or application 240 can comprise multiple modules and functionalities. These can include inbound processing of a nonGDS data segment 250. This information can be processed by a module 251 that identifies nonGDS-derived information (e.g., including but not limited to a NonGDS module) and GDS-derived information. A decision can be taken 258 whether a GDS booking is expected. If yes, control can pass to a nonGDS PNR (Passenger Name Record) merge module 252; it then can be determined if the PNR is rejected 253. If yes, control can pass to a NonGDS reject process 254. If no, control can pass to a module where the PNR is processed in a TR processing engine 255. Turning back to determination 258, if the determination is no then control can pass to TR processing engine 255.

Once processes are carried out per TR processing engine 255, a consolidated record 260 can be transmitted to a TR reporting module 256, and/or to a TR outbound process 257 then prepared for document delivery 270.

It will be appreciated that the consolidated record can contain some or all of the information associated with the GDS-derived information, and some or all of the information associated with nonGDS-derived information. In other words, a third travel record (consolidated record) can be created from a first travel record (GDS-derived information) and second travel record (nonGDS-derived information) assuming certain conditions are met, which will be discussed in further detail below.

Travel Arranger (TA). The travel arranger can be a TMC's customer, such as a mining company employee dedicated to human resources and logistics.

Travel Consultant (TC). The travel consultant can work for a TMC and can take request from TAs and book appropriate travel to get a customer employee from home to the worksite.

Travel Supervisor (TS). The supervisor can be responsible for a team of TCs, generally working for a single client. The supervisor can be responsible for monitoring SLAs (service level agreements) and the TC workload.

Administrator (A). The administrator can be responsible for allocation of supervisor rights.

For context, when a reservations record is created in connection with a GDS or nonGDS system or source, such entity can generate an electronic record listing passenger name, flight/train/bus number, origin city, destination city, and so on providing detailed information. However, the GDS electronic record can differ from the nonGDS electronic record. Indeed, the manner in which such electronic records can be stored in a database can be such that it may be difficult and unfeasible to be able to cross-reference the records with each other or otherwise for the system to integrate, understand or otherwise assign significance to them. As a result, attempts to coordinate booking a trip based on information in the GDS and nonGDS electronic records can be impracticable if not altogether impossible. In other words, electronic records in distinct formats, as stored on one or more systems, may not be able to support coordinated, efficient activities to create an overall journey, with disadvantages including those mentioned above.

Accordingly, in embodiments, enabling the system to process information derived from both GDS and nonGDS electronic records enables the system to source travel demand based on needs of individuals, maximize the opportunities to book both charter and commercial segments, ensure booking confirmations are passed to a nonGDS, GDS, both, or other system, and generate a consolidated itinerary for end-to-end booking.

It will be appreciated that many types of travel-reservations functionality can be used for many types of journeys by many types of travelers, and thus the application is not limited to specific embodiments herein.

For purposes of illustration, in embodiments a travel requisition associated with embodiments can be initiated by client functionality of a TMC. This can involve a number of travel segments to transport an individual from his or her commute base to a remote operational site; this request may also include accommodation requirements. The multiple segments involved in the journey can include without limitation RPT flights from the commute base to a commercial airport, charter flights such as to an operational site, and charter buses or hire cars to onshore locations, helicopter, water, etc.

In an example process, charter bookings associated with a trip request can be completed. Such booking can be associated with an identifier that can uniquely identify such booking, such as a trip request identifier (Trip Request ID). Based on client business rules around the scheduling and booking of future travel demand, trip requests can be managed in connection with a TC application and/or user interface and booking requests for TMC fulfilment. Travel Requests for fulfilment to a number of Travel Consultants' queues can be allocated. Travel Requests from a work queue can be retrieved, and commercial air, accommodation and car hire can be booked through a GDS. Once bookings are deemed complete, the travel request in the TC application and/or user interface can be updated with the GDS booking reference and the request marked as completed. This operation can update the nonGDS application such as a nonGDS module with the booking status and trigger submission of Trip Request details into an electronic record. The electronic record can use a PNR (Passenger Name Record) reference as a key or other identifier to merge commercial and charter segments into one consolidated itinerary which is transmitted to the traveller and electronically delivered to the nonGDS application or nonGDS module by a document delivery system. It will be appreciated that "itinerary" can mean a set of information relating to actual or potential travel plans, or any subset of information thereof.

Figure 3:
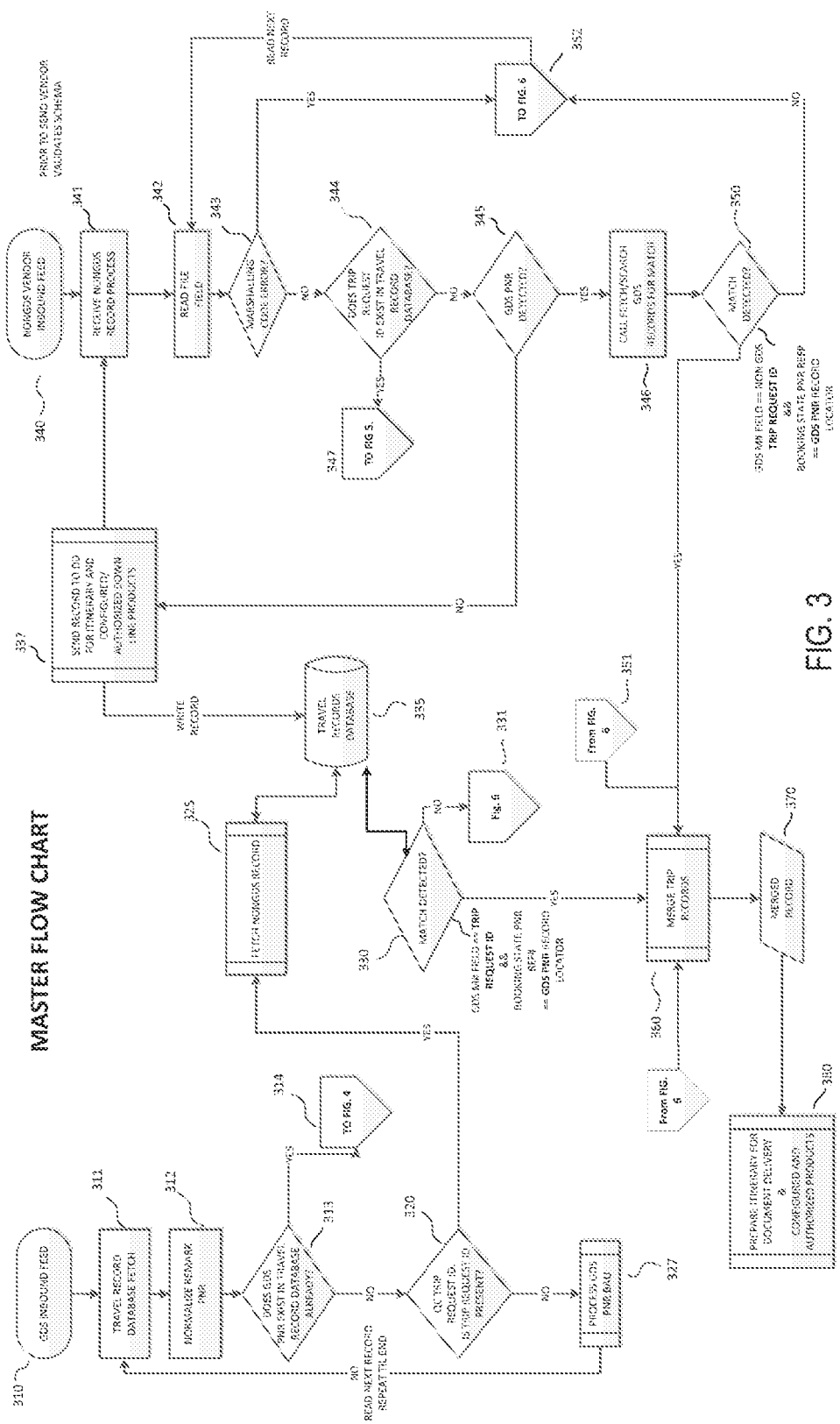
FIG. 3 illustrates one embodiment of a master process flow for consolidating records from distinct formats.

FIG. 3 illustrates one embodiment of a master process flow for consolidating records from distinct formats. Here information can be obtained from a GDS inbound feed 310, comprising travel options and information among other elements. It should be borne in mind that GDS feed 310 and nonGDS feed 340 can comprise numerous types, manners and formats of travel information related to a journey and/or travel reservations. A travel record fetch can be performed 311 by the system, from an electronic travel record database; this database can comprise or be associated with travel record database 335 or another database. A PNR remark can be normalized, and other aspects of PNR normalized as appropriate. A determination can be made whether the GDS PNR exists in a given electronic travel record database 313.

For context, it will be appreciated that an electronic travel record can have been generated and stored, which can comprise information from one or multiple sources. The electronic travel record can reside in a database of such electronic travel records or be stored under other circumstances. Such database can be a travel record database comprising and/or associated with travel record database 335 or another database.

Figure 4:
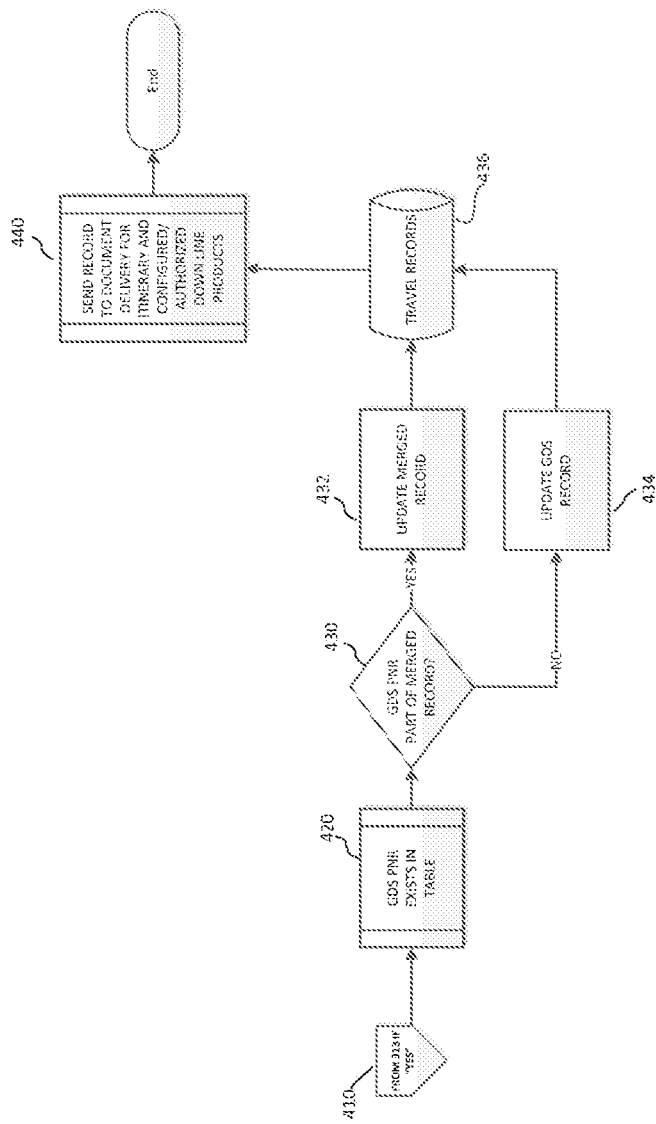
FIG. 4 illustrates one embodiment of a process flow for canceling information where the information derives from GDS source information.

If the answer at step 313 is yes, control can pass to FIG. 4 represented at 314. For example, assume that a change was made to a commercial flight. In this instance, it is nonetheless recognized that the PNR already exists in an electronic travel record database. At this point, as seen in FIG. 4, it can be determined if the PNR is part of the previously consolidated (i.e., merged) record; updating is done accordingly.

If no, control can pass such that a next determination is made, i.e., it can be ascertained whether a nonGDS trip request ID is present 320.

Again, for context, it will be appreciated that what can be interrogated is a PNR itself, or information containing and/or associated with a PNR, for the presence of a Trip Request ID.

If the answer at step 320 is yes, then a nonGDS record can be fetched 325 from a travel record database. If no, the GDS PNR can be processed on a "business as usual" basis 327 and the next record read.

Travel record database 335 can contain travel records comprising both GDS-derived and nonGDS-derived travel information. Travel record database 335 can be configured as one database or multiple databases in operative communication.

Assuming both a travel record with GDS-derived information and a travel record with nonGDS-derived information are present, a determination with respect to the two can be carried out at step 330. The nonGDS information, in counterpart fashion to the GDS information, can have its own source and flow to reach step 330.

Figure 5:
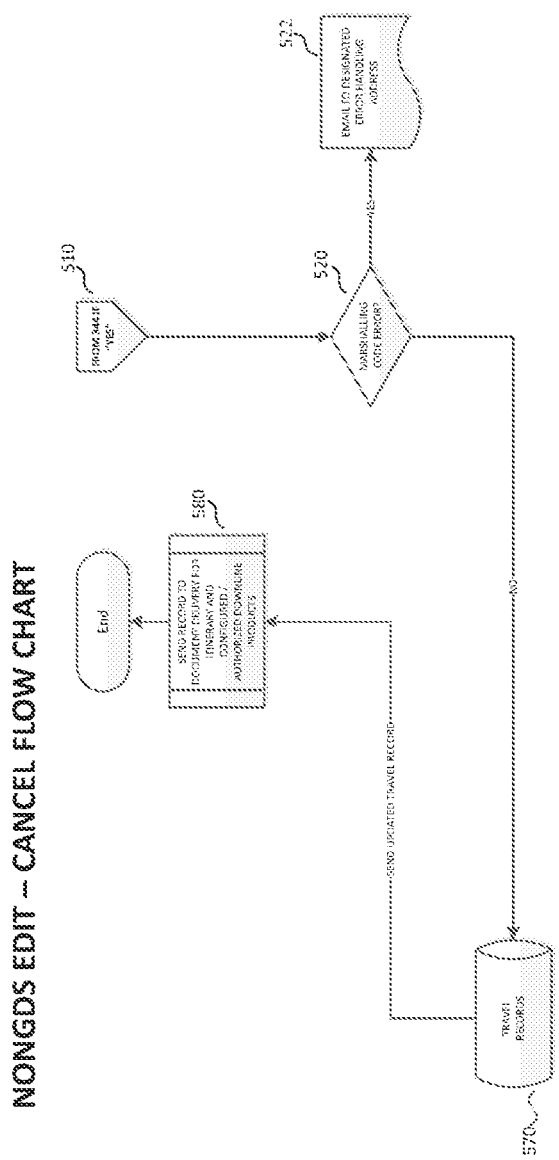
FIG. 5 illustrates one embodiment of a process flow for canceling information where the information derives from nonGDS source information.
Figure 6:
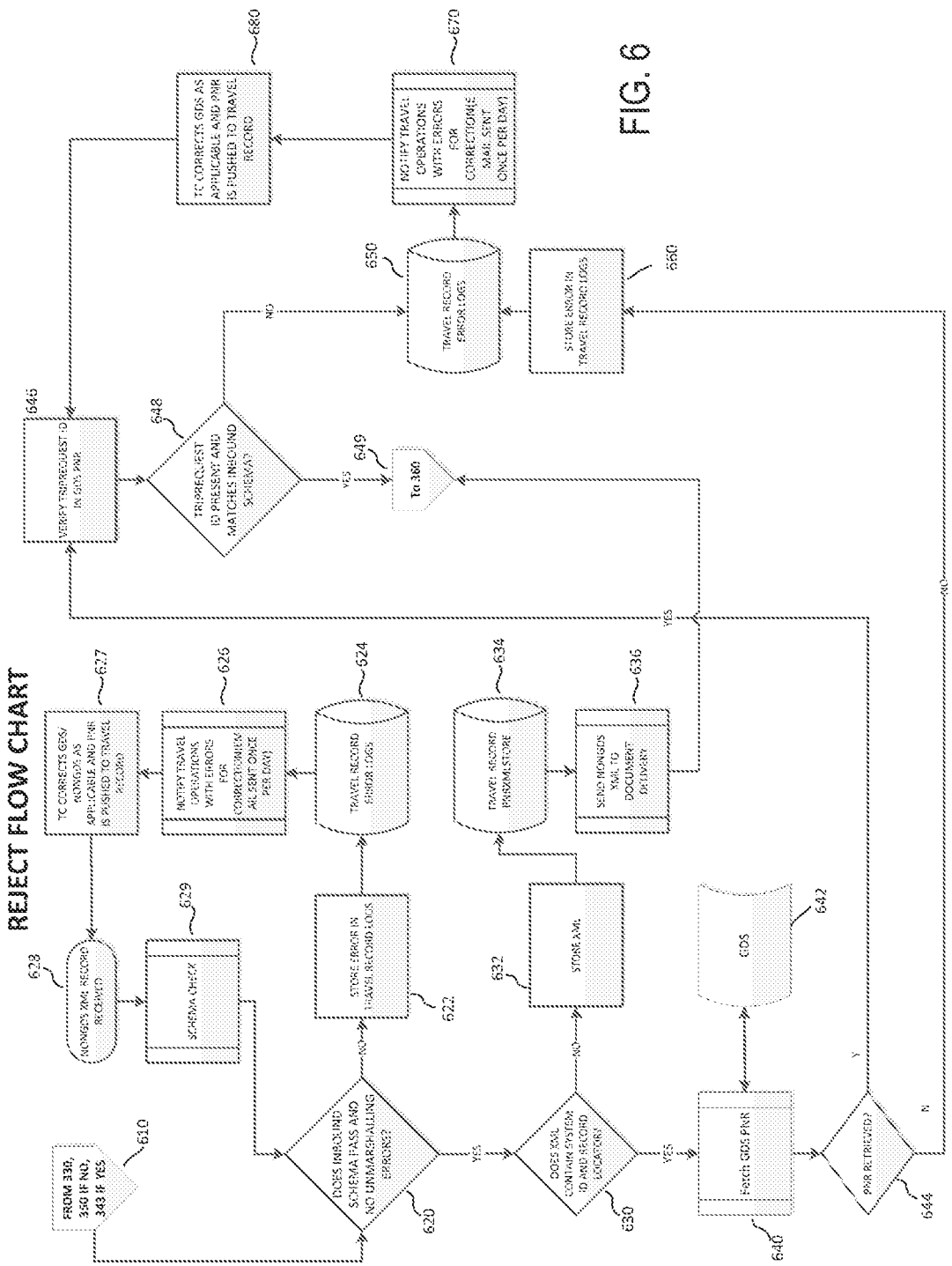
FIG. 6 illustrates one embodiment of a process flow in connection with a reject decision.

In embodiments, the inbound feed 340 for nonGDS vendors can contain travel information for charter-related reservations, rail, water, helicopter, or any other vendor not typically associated with a GDS. The vendor can validate the schema 341 to ensure it will be processable by the system database. A file field can be read 342. A determination can be made if there is a marshalling code error 343. If yes, control can pass to FIG. 6 represented by 352. If no, a determination can be made whether the Trip Request ID exists in the nonGDS travel record. A Trip Request ID reflects an identifier associated with a given journey or any of its components (air, accommodation, vehicle, etc.) If yes, control can pass to FIG. 5 represented by 347. If no, an added determination can be made whether a GDS PNR is detected. If no, then the record can be sent to document delivery 337 and then passed to a travel records database 335. If the determination at step 345 is yes, an inquiry 346 relating to GDS travel records can be made. A determination can then be made 350 whether a match is detected of GDS-derived and nonGDS-derived information.

An embodiment depicting determination 330 and determination 350 can be illustrated further by way of illustration with respect to FIG. 7A and FIG. 7B. FIG. 7A shows an embodiment of a travel record that can be derived from nonGDS source information. FIG. 7B illustrates an embodiment of a travel record that can be derived from GDS source information.

A record derived from a GDS 730 can contain a first field 732 containing a first value 733. The first field 732 in a GDS-derived record 730 can be associated with information such as a PNR record locator. The first value in the first field can take a unique value, here RCGVKL. In turn, for a nonGDS-derived-record 710 (such as for charter-related arrangements, or indeed any travel arrangements) there can be a first field 712 containing a first value 713. Fields 712 and 732 can both comprise or be related to a PNR record locator or other identifier. It is seen that field 712 contains the value 713 RCGVKL. In other words, the values 713 and 733 match. By "match" is meant "identical" or "functionally similar to", depending on rules implemented by the system.

Further, a record derived from a GDS 730 can contain a second field 734 containing a second value 735. The second field 734 in a GDS-derived record 730 can be associated with information such as a Trip Request ID. A value in the second field can take a unique value, here 0000A2. In turn, for a nonGDS-derived-record 710 (such as for charter-related arrangements, or indeed any travel arrangements) there can be a second field 714 containing a second value 715. Fields 714 and 734 can both comprise or be related to a Trip Request ID or other identifier. Field 714 (or field 734) can also be called the M #field, or any other name considered suitable for use. It is seen that field 714 contains the value 0000A2 715. In other words, the values 715 and 735 match. By "match" is meant "identical" or "functionally similar to", depending on rules implemented by the system.

In non-limiting embodiments, then, a determination can be represented at step 330 and step 350. This determination can be represented by among other things two tests:
1. Does the value 735 in the GDS M #field 734 match the value 715 in the nonGDS Trip Request ID field 714?
2. Does the value 733 in the GDS PNR Record Locator field 732 match the value 713 in the nonGDS booking state PNR reference number field 712?

If the answer to both questions is yes, then the system can consolidate some or all of the information comprised in the otherwise distinct GDS-derived record and nonGDS-derived record, thus moving on to step 360.

If the answer to one or both questions is no, then the system can proceed to FIG. 6 represented by 331 and 352.

It will be appreciated that the above test can be understood in boolean terms. In other words, a boolean AND operation can be performed on 1 and 2. If both return true, then records can be consolidated. If one or both return false, then alternate paths can be indicated. It will also be appreciated that the field for a PNR can be understood as a reservation identifier field, and further understood that such reservation identifier field can be considered an identifier for suitable travel information that can be associated with an actual or potential itinerary. Such reservation identifier field can also relate to travel information prior to, contemporaneous with, or after reserving travel or transportation options. In embodiments, then, it will be appreciated that contemplated are a first electronic travel record with a first and second field containing respectively first and second values, and a second electronic travel record with a third and fourth field containing respectively third and fourth values. Each travel record can contain an itinerary identifier field, which can be unique.

The decision at step 330 can be functionally similar to the decision embodied at step 350. In other words, a similar test can be performed with respect to information proceeding from a path on which is located a GDS-derived feed 310 as information proceeding from a path on which is located a nonGDS-derived feed 340. Thus, it will be appreciated that non-identical but similar mechanisms can be employed.

Figure 8C:
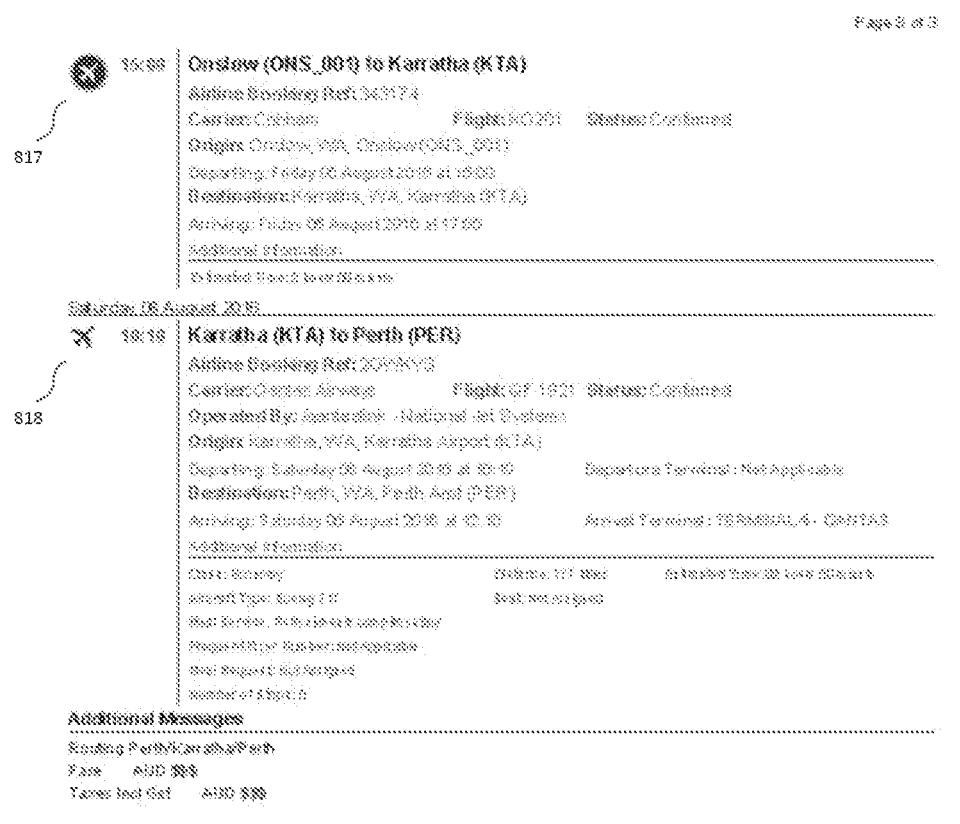

A consolidated record obtained as a result of the consolidation step can be seen in FIGS. 8A, 8B and 8C. Booking reference 810 is an analog of the PNR. It will be understood that booking reference 810 can be a Trip Request ID if the itinerary is for a nonGDS trip only. More broadly, booking reference 810 can represent a unique identifier for an itinerary. Commercial flight information is shown 811, and hotel accommodations shown 812; these can be associated with GDS-derived information. In addition, charter (non-commercial) flight information is shown 813, with reservations for a helicopter to camp 814, camp 815, and helicopter from camp 816 shown, as well as charter flight information 817: these can be associated with nonGDS-derived information. Finally, commercial flight information is shown 818, this again being associated with GDS-derived information. In short, the one consolidated record 370 illustrated in FIGS. 8A, 8B and 8C contains elements from both GDS and nonGDS-derived travel information.

The consolidated record 370 can be stored in multiple formats. One is a human-readable format. Another is an XML format, like that in which the GDS record or nonGDS record could have been stored. By consolidating the records, the system can deliver the consolidated record to an individual(s) for acting upon in a manner that XML-stored records—which, on top of this, may be amalgams of non-standardized, disparate travel information—may not. It will be appreciated that the GDS-derived record, the nonGDS-derived record, and the consolidated record can, however, be stored and used in multiple formats. In addition, the resulting consolidated record can omit or filter out duplicative and/or less relevant or helpful fields and values, yielding a consolidated record that can be at the same time efficient and containing only certain more desired types of information, but also be dependable, robust and deliver maximum information with minimum irrelevant elements. In addition, the consolidated record can be integrated with and/or otherwise used by travel-related functionalities for further processing in many ways. The traveller, travel agent, travel management company and other entities can gain enhanced visibility, manageability and control over the travel process, such as where more relatively publicly available travel information (such as that from a GDS) can be integrated with that of more relatively "nonpublic"—or generally privately arranged—information such as from a charter The consolidated trip record, which now can contain the PNR and Trip Request ID, can now be located by either the PNR or Trip Request ID, among other identifiers. As such, the PNR and Trip Request ID—or other unique identifier—can serve as a key for database table use into other tables, records, and databases. Data can now be pushed to downstream systems and products 380. One such system is printing mechanisms (electronic, paper or both) that can be accessed in connection with GDS reservations, nonGDS reservations, or other travel reservations. Another system can be a duty of care system. Other value-added functionalities can be employed. An assumption can be made, as appropriate, that document delivery will not send consolidated GDS PNR itineraries unless a corresponding GDS PNR is received in a document delivery queue. The same can be provided for nonGDS itineraries.

FIG. 4 shows an embodiment of a GDS Edit—Cancel process. Here it is determined if the GDS PNR is part of a merged record already. If yes, then the merged record can be updated and/or otherwise modified and prepared for further processing. The updating can consist of overwriting data as appropriate, or performing another function.

In embodiments, after entering from 313, it can be observed that a GDS PNR is stored as in a table 420. A determination is made 430 whether the GDS PNR is part of a merged (consolidated) record already. If no, the GDS record can be updated 434 and an updated/modified travel record stored 436. If yes, the merged record can be updated and then an updated/modified travel record stored 436. At this point a record can be sent to document delivery 440 for further actions and/or processing.

In embodiments, it can be determined if a GDS record exists in the table. Also, it can be determined if the Trip Request ID exists in the table. A field XX can be assigned a nonGDS record locator. The nonGDS record can be found and assigned a BookingState.PNRREF. The record locator can be considered a GDS record locator ID. The trip can be updated. GDS record trip data can be overwritten with a new trip data, and nonGDS trip data unchanged.

FIG. 5 is a counterpart of FIG. 4 where the process is customized for travel information derived from a nonGDS source. FIG. 5 shows an embodiment of a non-GDS Edit—Cancel process. There are functional similarities with processes in FIG. 4. For example, assume that a change is made to a charter flight. At step 344, it is recognized that nonGDS record information already is associated with an electronic travel record database such as travel record database 335, or another database.

Entry can be made from 344 represented at step 510. It can be determined if there is a marshalling code error 520. If yes, a notification can be sent with the error for appropriate handling 522. If no, then the record can be sent for storage in a travel records database 570. Once a travel record is processed then stored 570, the updated record can be sent to document delivery and for further actions and processing 580. An assumption can be made, as appropriate, that document delivery will not send consolidated GDS PNR itineraries unless a corresponding GDS PNR is received in a document delivery queue. The same can be provided for nonGDS itineraries.

FIG. 6 shows a Reject process. This can occur where the determination performed as appropriate at 330 or 350 yields a negative result, or the determination at 343 yields a positive result. It is then determined if there is a schema pass and no unmarshalling errors 620. If the answer is no, an error can be stored in travel record logs 622 and control pass to travel record error logs 624. At this point, appropriate systems and/or personnel can be notified of the error 626, and a TC can correct a GDS-derived/nonGDS-derived record as applicable, and the PNR pushed to a travel record 627. A nonGDS XML record can be received 628, and a schema check performed 629. Control can now pass back to step 620 for determinations as to schema and unmarshalling.

If the determination at step 620 is yes, a further determination can be made, i.e., does relevant XML contain a system ID and record locator 630? If no, the XML can be stored, such as in a travel record PNRXML store 634. At such point a nonGDS XML delivery can be made 636; additionally, control can pass to 360 as represented by 649. If the determination at step 630 is yes, then a GDS-derived PNR can be fetched 640 from a source such as a GDS 642. If a PNR is retrieved 644, then a Trip Request ID can be verified in the GDS PNR 646. Additionally, it can be determined whether the Trip Request ID is present and matches an inbound schema 648. If yes, control can pass to step 360 in FIG. 3, represented here as step 649. As will be recalled, step 360 indicates that trip records can be consolidated. If the determination at step 648 is no, then a travel record error can be logged and stored 650, after which appropriate systems and/or personnel can be notified of the error 670, and a TC can correct a GDS-derived/nonGDS-derived record as applicable 680. After this, it can be veriifed if the Trip Request ID is in a GDS PNR 646. However, if the determination at step 644 is no, then control can pass such that an error is stored in travel record logs 660, such as database containing same 650.

In embodiments, further description and details are provided below.

Web service integration can comprise custom-developed adapters that integrate the nonGDS travel options and information and a GDS system and/or with proprietary systems available to a TMC that can interact with a GDS. They can provide services including the following: allow the TC application and/or user interface to display and update future travel information stored in the nonGDS travel options and information module, provide electronic records with non-GDS flight and accommodation information for inclusion in the consolidated itinerary, and receive the consolidated itinerary from a document delivery system The TC application and/or user interface application can provide workflow management of a travel request. It can track which Travel Requests have been submitted to a TMC for booking, which TC is assigned to the request, the completion status of the request and the ability to capture some reference information back to a module comprising nonGDS travel options and information to link components of itineraries.

A GDS enables Travel Management Companies to search, price, book, and ticket travel services provided by airlines, hotels, car rental companies, rail providers and tour operators. The Travel Consultant can use a GDS to book services based on Travel Requests displayed by the TC application and/or user interface. The GDS can be linked to travel records for the production of travel itineraries containing the services booked through this system. Finishing and quality assurance checks can be performed on a reservation, and these functionalities can interact with the GDS to add data elements. It will be appreciated that the GDS is an instance of a first travel database comprising travel information. Information obtained substantially from nonGDS sources can be considered as deriving from a second travel database.

Travel records can be used to capture travel and traveller data elements and distribute to other applications for reporting, tracking and duty of care management. Data can be normalised and consolidated from the GDS based on a standard such as OTA (Open Travel Alliance standard).

Data can also be consolidated to generate an end to end itinerary by merging non-GDS transport and accommodation services with commercial transport, accommodation and hire data from the GDS.

Document delivery mechanisms can be used to send the consolidated itinerary generated by travel records to a module comprising nonGDS travel options and information, or another module. In addition the document delivery mechanisms can transmit the consolidated itinerary directly to the traveller such as by email.

A secure FTP Server can be invoked periodically by document delivery mechanisms to deliver in batches the consolidated itineraries generated by travel records. These itineraries can be uploaded a module comprising nonGDS travel options and information.

A consolidated itinerary can include non-GDS information such as charter flights and camp accommodation sourced from a module comprising nonGDS travel options and information, such as a nonGDS module, and commercial travel data that booked within the GDS.

A TCM's Duty of Care application, which can use travel records data, can track personnel movement. It can use tracking technology to proactively manage travellers impacted by emergency situations. It can have certain functions including: pinpoint location of travellers; communicate with travellers impacted by an emergency situation; prioritise the management of impacted travellers; and safely resolve problems for travellers impacted by an emergency situation.

An online booking tool (OBT) can make domestic and point to point international travel bookings. It can allow automation of booking with no human intervention. File finishing and quality control checks can determine that a PNR requires human intervention, or a customer can add notes such that human intervention for the booking to be completed may be an option.

While various details have been set forth in the foregoing description, it will be appreciated that the various aspects of the record consolidation process may be practiced without these specific details. For example, for conciseness and clarity selected aspects may have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art.

Reference to "one aspect," "an aspect," "one embodiment," or "an embodiment" means that a particular method, feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular methods, features, structures or characteristics may be combined in any suitable manner in one or more aspects.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the claims are intended to cover all such modifications and variations as falling within the scope of the disclosed embodiments.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

One skilled in the art will recognize that the herein described methods, systems, components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "in operative communication", "operably connected," or the like to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the claims, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

With respect to the claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other adjectives are generally not intended to exclude such variants, unless context dictates otherwise.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the claims are intended to cover all such modifications and variations as falling within the scope of the disclosed embodiments. The claims are intended to cover all such modifications and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated.

What is claimed is:

1. A system for consolidating electronic travel records of a journey upon determining that a schema in which privately arranged, non-commercial reservations are stored has passed a validation check, the system comprising:
   a record consolidation server configured to:
      accept an inbound feed with privately arranged, non-commercial reservations information, the inbound feed having an inbound schema;
      validate the inbound schema with which the privately arranged reservations information is associated, to ensure the system can process the inbound schema;
      enter a reject process to determine if records from distinct formats can be consolidated, the reject process comprising:
         determine that the inbound schema passes and there are no unmarshalling errors;

determine that an XML record contains a system identifier and record locator;
fetch a Passenger Name Record from a Global Distribution System;
verify a trip request identifier in the Passenger Name Record;
determine that the trip request identifier matches the inbound schema;
store, in a first travel record structured to be associated with the Passenger Name Record from the Global Distribution System, wherein the first travel record contains a travel reservation from a commercial flight:
  a first itinerary identifier that uniquely identifies a set of travel information for a trip derived from publicly available commercial travel options, and
  a second itinerary identifier that uniquely identifies a set of travel information for a trip derived from privately arranged, non-commercial travel options;
store, in a second travel record structured to be associated with a trip request identifier from the privately arranged, non-commercial travel reservations:
  a third itinerary identifier that uniquely identifies a set of travel information for a trip derived from publicly available travel options, and
  a fourth itinerary identifier that uniquely identifies a set of travel information for a trip derived from privately arranged, non-commercial travel options;
consolidate the first travel record and the second travel record into a consolidated travel record; and
deliver a message to a user comprising the consolidated travel record.

2. The system of claim 1, wherein the set of travel information based on the privately arranged, non-commercial reservations information is associated with a charter flight, a charter bus, a helicopter, a rail trip segment, a water trip segment, or campsite accommodations.

* * * * *